United States Patent
Hayashi

(10) Patent No.: US 9,710,201 B2
(45) Date of Patent: Jul. 18, 2017

(54) IMAGE FORMING APPARATUS CAPABLE OF DISPLAYING INITIAL SCREEN BASED ON PAST SETTING INFORMATION, METHOD OF CONTROLLING THE IMAGE FORMING APPARATUS, AND STORAGE MEDIUM

(71) Applicant: CANON KABUSHIKI KAISHA, Tokyo (JP)

(72) Inventor: Tomonori Hayashi, Kawasaki (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 14/247,300

(22) Filed: Apr. 8, 2014

(65) Prior Publication Data

US 2014/0300920 A1 Oct. 9, 2014

(30) Foreign Application Priority Data

Apr. 8, 2013 (JP) .................................. 2013-080388
Feb. 25, 2014 (JP) .................................. 2014-034161

(51) Int. Cl.
G06F 3/12 (2006.01)
H04N 1/00 (2006.01)
H04N 1/44 (2006.01)

(52) U.S. Cl.
CPC .......... *G06F 3/1204* (2013.01); *G06F 3/1222* (2013.01); *H04N 1/00413* (2013.01);
(Continued)

(58) Field of Classification Search
CPC .............. G06F 3/1204; H04N 1/00514; H04N 1/00413
(Continued)

(56) References Cited

U.S. PATENT DOCUMENTS 8,654,363 B2 * 2/2014 Sugaya .............. H04N 1/00204
358/1.13
8,724,136 B2 5/2014 Yamamoto
(Continued)

FOREIGN PATENT DOCUMENTS

CN 102170503 A 8/2011
CN 102739900 A 10/2012
(Continued)

OTHER PUBLICATIONS

Extended European Search Report issued in corresponding European Patent Application No. 14163750.4. dated Feb. 26, 2015.
(Continued)

*Primary Examiner* — Benjamin O Dulaney
(74) *Attorney, Agent, or Firm* — Rossi, Kimms & McDowell LLP

(57) ABSTRACT

An image forming apparatus improved in user-friendliness of operation for making settings concerning the operation of applications. A storage control section stores personal settings in a HDD, on an application-by-application basis. An authentication section authenticates a user. A display control unit is configured to, in response to selection of an application by the user authenticated by the authentication section, read from the HDD personal settings associated with the application, and display the personal settings on a console section.

6 Claims, 14 Drawing Sheets

| | | 501 | 503 | 502 | 504 | 506 | 505 | 507 | 509 | 508 | 510 | 511 |

| USER IDENTIFIER | COPY SETTING INFORMATION | | TRANSMISSION SETTING INFORMATION | | STORAGE SETTING INFORMATION | | STATE-BEFORE-LOGOUT |
|---|---|---|---|---|---|---|---|
| | PERSONAL SETTINGS | STORAGE SETTING | PERSONAL SETTINGS | STORAGE SETTING | PERSONAL SETTINGS | STORAGE SETTING | |
| A00001 | DOUBLE-SIDED PRINTING, FINISHER | ON | – | OFF | DOUBLE-SIDED PRINTING, FINISHER, DOCUMENT ID: 01 | ON | COPY |
| A00002 | – | ON | DOUBLE-SIDED PRINTING, ADDRESS: 172.xx.xx.xx | ON | – | OFF | TRANSMISSION |
| – | – | – | – | – | – | – | – |

(52) U.S. Cl.
CPC ..... *H04N 1/00474* (2013.01); *H04N 1/00482* (2013.01); *H04N 1/00514* (2013.01); *H04N 1/4413* (2013.01)

(58) Field of Classification Search
USPC .................................................. 358/1.9, 1.16
See application file for complete search history.

(56) References Cited

U.S. PATENT DOCUMENTS

| | | | |
|---|---|---|---|
| 8,934,118 B2* | 1/2015 | Uchida | H04N 1/0035 358/1.13 |
| 2005/0068560 A1* | 3/2005 | Ferlitsch | H04L 67/02 358/1.13 |
| 2009/0024950 A1* | 1/2009 | Salgado | G06F 3/1204 715/772 |
| 2009/0310180 A1* | 12/2009 | Uchida | H04N 1/0035 358/1.15 |
| 2009/0319889 A1 | 12/2009 | Nakada et al. | |
| 2010/0097630 A1* | 4/2010 | Schwartz | G06F 3/1205 358/1.15 |
| 2010/0245909 A1 | 9/2010 | Yamaguchi | |
| 2010/0296122 A1* | 11/2010 | Mitsui | G06F 3/1254 358/1.15 |
| 2011/0055266 A1 | 3/2011 | Varadarajan et al. | |
| 2011/0055366 A1* | 3/2011 | Okamura | G06F 21/629 709/223 |
| 2011/0199623 A1* | 8/2011 | Okuyama | H04N 1/00408 358/1.9 |
| 2011/0276959 A1 | 11/2011 | Kobayashi | |
| 2012/0144478 A1* | 6/2012 | Homma | H04N 1/00411 726/19 |
| 2012/0229832 A1 | 9/2012 | Tsujimoto | |
| 2012/0262749 A1* | 10/2012 | Yamamoto | H04N 1/00244 358/1.14 |
| 2012/0268782 A1* | 10/2012 | Hamaguchi | G06F 3/1204 358/1.15 |
| 2012/0281251 A1* | 11/2012 | Salgado | G06F 3/1204 358/1.15 |
| 2014/0031115 A1* | 1/2014 | Tanabe | A63F 13/10 463/31 |

FOREIGN PATENT DOCUMENTS

| | | |
|---|---|---|
| EP | 2 075 692 A1 | 7/2009 |
| EP | 2075693 A1 | 7/2009 |
| JP | 2008-273126 A | 11/2008 |
| JP | 2009302890 A | 12/2009 |
| JP | 2010033182 A | 2/2010 |
| JP | 2011166781 A | 8/2011 |
| JP | 2012078917 A | 4/2012 |

OTHER PUBLICATIONS

Notice of Allowance issued in Korean Appln. No. 10-2014-0039811, mailed Oct. 27, 2016. English translation provided.

Office Action issued in Chinese Patent Application No. CN201410138177.8, mailed Sep. 26, 2016. English translation provided.

* cited by examiner

FIG. 3

| USER IDENTIFIER (501) | COPY SETTING INFORMATION (502) || TRANSMISSION SETTING INFORMATION (505) || STORAGE SETTING INFORMATION (508) || STATE-BEFORE-LOGOUT (511) |
|---|---|---|---|---|---|---|---|
| | PERSONAL SETTINGS (503) | STORAGE SETTING (504) | PERSONAL SETTINGS (506) | STORAGE SETTING (507) | PERSONAL SETTINGS (509) | STORAGE SETTING (510) | |
| A00001 | DOUBLE-SIDED PRINTING, FINISHER | ON | — | OFF | DOUBLE-SIDED PRINTING, FINISHER, DOCUMENT ID: 01 | ON | COPY |
| A00002 | — | ON | DOUBLE-SIDED PRINTING, ADDRESS: 172.xx.xx.xx | ON | — | OFF | TRANS-MISSION |
| — | — | — | — | — | — | — | — |

FIG. 7

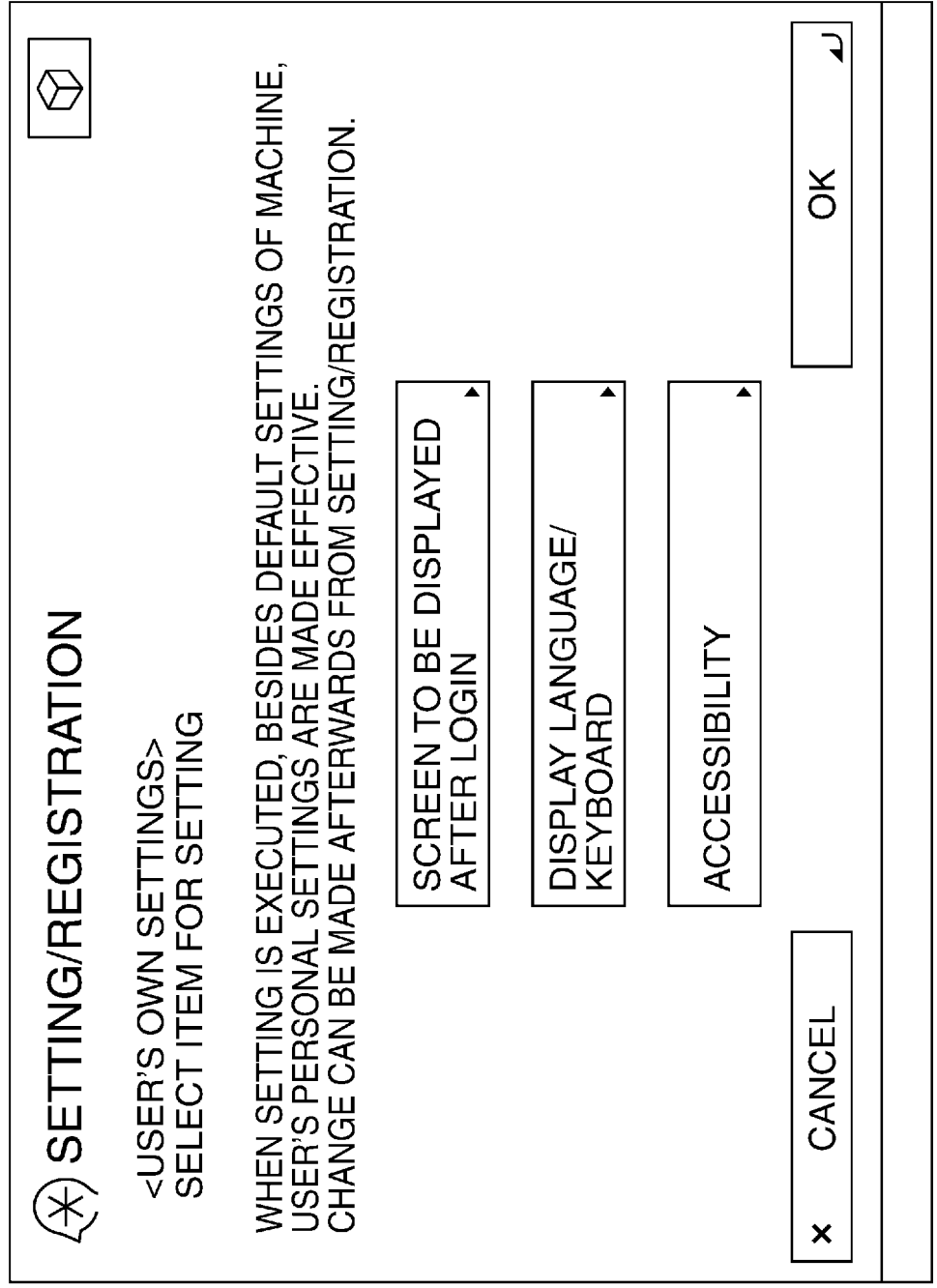

IMAGE FORMING APPARATUS CAPABLE OF DISPLAYING INITIAL SCREEN BASED ON PAST SETTING INFORMATION, METHOD OF CONTROLLING THE IMAGE FORMING APPARATUS, AND STORAGE MEDIUM

BACKGROUND OF THE INVENTION

Field of the Invention

The present invention relates to an image forming apparatus, a method of controlling the same, and a storage medium.

Description of the Related Art

In recent years, an image forming apparatus has been equipped with various functions, and operations to be executed by a user have become complicated. In general, an image forming apparatus, which is often shared by a plurality of users, is provided with an auto-clear function for use in automatically clearing settings changed by a user, after the lapse of a predetermined time period so as to prevent a next user from using the settings without being aware of the changed settings.

When using such an image forming apparatus, each user needs to select a desired setting screen from an initial menu provided for the image forming apparatus, whenever the user starts to use the image forming apparatus.

For this reason, even if settings usually used by a user are predetermined or fixed, the user has to make the same settings, which is troublesome to him/her.

To solve this problem, there has been proposed a customization function which allows each user to make initial settings as desired. In this customization function, however, a user himself/herself has to carry out operations for customizing settings, and therefore if the user is inexperienced in using the image forming apparatus, he/she finds difficulty in the customization operations.

To overcome this problem, there has been disclosed a technique in which when a user sequentially selects a plurality of functions within a predetermined time period after user authentication, details and a preference order of selections are stored in association with the user (see e.g. Japanese Patent Laid-Open Publication No. 2008-273126).

In this technique, when a display control section reads out customization information associated with a user from a customization information storage section, the display control section reads out and displays an initial display screen associated with a first-selected function (first in the preference order) of the plurality of functions on a touch panel.

With this technique, a preference order of selections of functions is taken into consideration for each of a plurality of users, whereby it is possible to provide initial display screens appropriately customized on a user-by-user basis.

However, in the conventional technique, each initial display screen is a screen associated with a function selected first in the immediately preceding use of the image forming apparatus. Therefore, in a case where the image forming apparatus has setting screens of a plurality of applications, if, after an initial display screen associated with one application is displayed, the application is switched to another application, it is required to make settings on a screen displayed after the switching of the application. This means that the above-described conventional technique does not always contribute to improvement of user-friendliness.

Further, when a first-selected function is not set such that it can be normally terminated or when an erroneous operation is performed, the displayed screen is reproduced as an initial display screen. This leads to the inconvenience that the user has to make settings again when using the image forming apparatus next time.

SUMMARY OF THE INVENTION

The present invention provides an image forming apparatus improved in user-friendliness of operation for making settings concerning the operation of applications, a method of controlling the image forming apparatus, and a storage medium.

In a first aspect of the present invention, there is provided an image forming apparatus comprising a storage unit configured to store personal settings on an application-by-application basis, an authentication unit configured to authenticate a user, and a display control unit configured to, in response to selection of an application by the user authenticated by the authentication unit, read personal settings associated with the application from the storage unit, and display the personal settings on a display section.

In a second aspect of the present invention, there is provided a method of controlling an image forming apparatus on which a plurality of applications are installed, comprising storing settings concerning operation of each application in a storage section, in association with user information indicative of a user who has made the settings on the application, as personal settings, on an application-by-application basis, authenticating a user using the user information, and when displaying a setting screen of one of the plurality of applications on a display section in response to an operation of a user authenticated by said authenticating, acquiring from the storage section settings associated with user information of the user, and displaying a setting screen according to the acquired settings, on the display section.

In a third aspect of the present invention, there is provided a non-transitory computer-readable storage medium storing a control program for executing a method of controlling an image processing apparatus on which a plurality of applications are installed, wherein the method comprises storing settings concerning operation of each application in a storage section, in association with user information indicative of a user who has made the settings on the application, as personal settings, on an application-by-application basis, authenticating a user using the user information, and when displaying a setting screen of one of the plurality of applications on a display section in response to an operation of a user authenticated by said authenticating, acquiring from the storage section settings associated with user information of the user, and display a setting screen according to the acquired settings, on the display section.

According to the present invention, it is possible to store settings of applications, on an application-by-application basis, and hence when the user causes a setting screen of a desired application to be displayed, there is displayed the setting screen on which the stored settings are reflected. This saves the user from performing setting operations again, and hence it is possible to improve user-friendliness of operation for making settings concerning the operation of the application.

Further features of the present invention will become apparent from the following description of exemplary embodiments (with reference to the attached drawings).

BRIEF DESCRIPTION OF THE DRAWINGS

FIG. 3 is a diagram of an example of a database of personal settings stored in an HDD appearing in FIG. 1.

FIG. 7 is a view of a storage screen displayed on the console section appearing in FIG. 1.

FIG. 15 is a view of a screen displayed when a "User's Own Settings" button in the main menu screen in FIG. 14 is pressed, for use in registering personal settings.

DESCRIPTION OF THE EMBODIMENTS

The present invention will now be described in detail below with reference to the accompanying drawings showing embodiments thereof.

Figure 1:
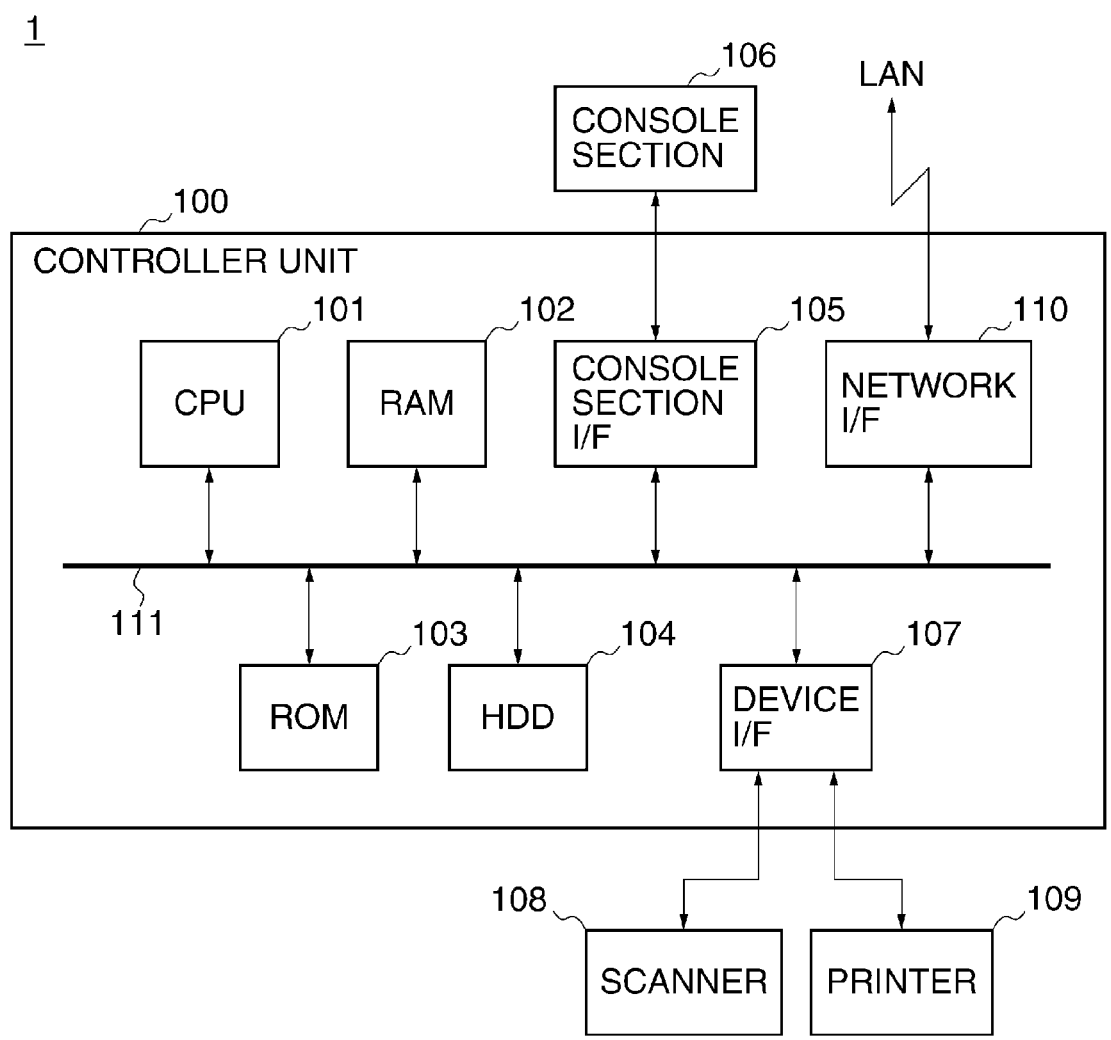
FIG. 1 is a schematic block diagram of an image forming apparatus according to an embodiment of the present invention.

FIG. 1 is a schematic block diagram of an image forming apparatus 1 according to an embodiment of the present invention.

As shown in FIG. 1, the image forming apparatus 1 comprises a controller unit 100, a console section 106, a scanner 108, and a printer 109.

The controller unit 100 comprises a CPU 101, a RAM 102, a console section interface 105, a network interface 110, a ROM 103, an HDD 104, and a device interface 107, which are interconnected by a system bus 111.

The CPU 101 controls the components connected to the system bus 111 in a centralized manner to thereby control the overall operation of the image forming apparatus 1.

The RAM 102 stores an operating system, system software, application software, and the like programs, and data. The programs stored in the RAM 102 are each executed by the CPU 101. The CPU 101 processes data, such as image data, stored in the RAM 102, the ROM 103, and the HDD 104.

The ROM 103 stores a boot program for the system, a system program, application programs, and information, such as font information, necessary for the image forming apparatus.

The HDD 104 as a storage section stores the operating system, the system software, the application software, image data, and settings data concerning operations of the applications. Processes in flowcharts, described hereinafter, are each realized by the CPU 101 which loads an associated one of the programs stored in the HDD 104 into the RAM 102, and executes the program. Note that in the case of a small-sized image forming apparatus, the system software, the application software, and the like may be stored in the ROM 103, and the HDD 104 may not be provided in the image forming apparatus. The HDD 104 may be replaced by an SSD (solid state drive).

The console section interface 105 provides interface between the console section 106 including a touch panel, not shown, and the controller unit 100. The console section interface 105 outputs image data to be displayed on the console section 106 to the same, and transfers information input by a user via the console section 106 to the CPU 101. The console section 106 as a display section displays a screen enabling the user to give an instruction e.g. for starting printing, and screens enabling the user to make print settings, including a setting of page layout on a sheet, settings of a finisher operation, such as stapling, and settings of image quality, such as density.

The device interface 107 provides interface between the scanner 108 as an image input device and the controller unit 100, and also provides interface between the printer 109 as an image output device and the controller unit 100.

Image data input from the scanner 108 via the device interface 107 is stored in the RAM 102 or the HDD 104. The stored image data is subjected to image processing or the like, as required, by an application program stored in the RAM 102.

Further, the image data is output to the printer 109 via the device interface 107.

The network interface 110 is connected to a network to send and receive image data, information for controlling the image forming apparatus 1, and the like, to and from external apparatuses.

In addition to the above-described components, the image forming apparatus 1 may include a device for realizing a facsimile function, an interface between the image forming apparatus 1 and a memory card, a USB interface, and so forth.

Figure 2:
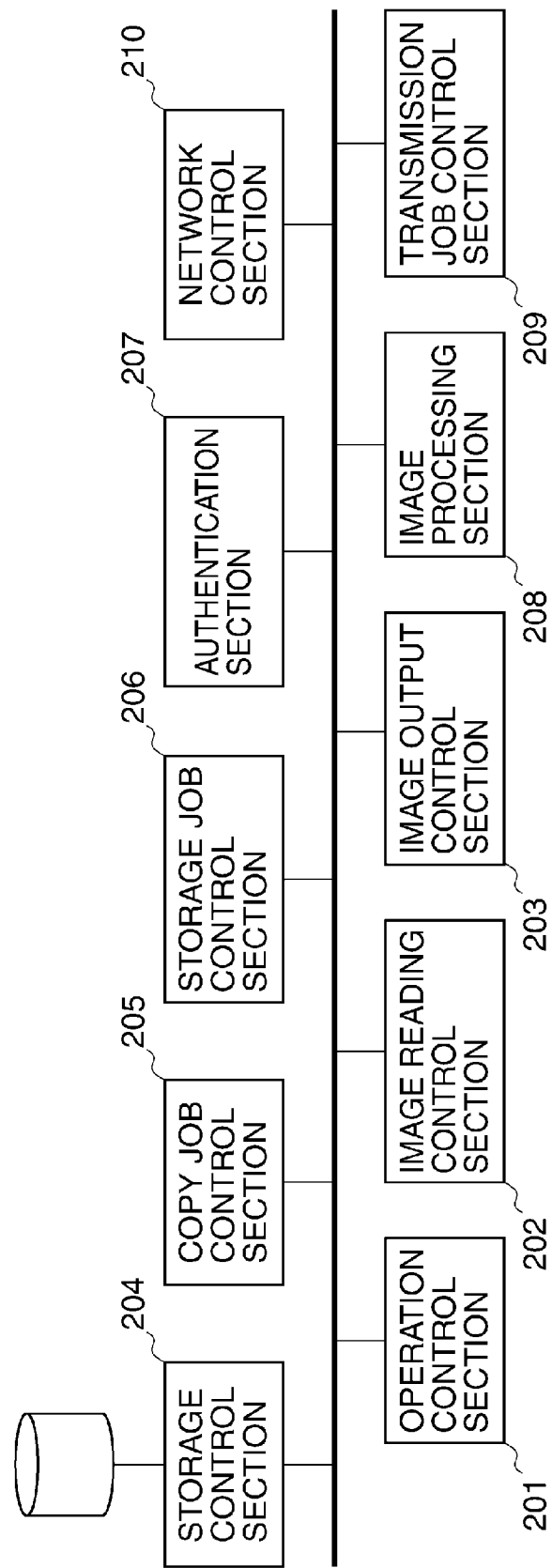
FIG. 2 is a block diagram showing the software configuration of the image forming apparatus shown in FIG. 1.

FIG. 2 is a block diagram showing the software configuration of the image forming apparatus 1 shown in FIG. 1.

The image forming apparatus 1 comprises a storage control section 204, a copy job control section 205, a storage job control section 206, an authentication section 207, a network control section 210, an operation control section 201, an image reading control section 202, an image output control section 203, an image processing section 208, and a transmission job control section 209.

The storage control section 204 performs control concerning storage to the RAM 102 and the HDD 104. The copy job control section 205 performs control concerning copy settings and a copy operation. The storage job control section 206 performs control concerning print data stored e.g. in the HDD 104.

The authentication section 207 performs control concerning authentication for allowing users to use the image forming apparatus 1. Specifically, for example, the authentication section 207 displays a screen on the console section 106 to prompt the user to enter his/her user name and password.

When the user name and password are entered on the console section 106, the input user name and password are sent to the authentication section 207 via the console section interface 105. The authentication section 207 verifies the user name and password against a user database of combinations of user names and passwords stored in the HDD 104 of the image forming apparatus 1, and authenticates the user when the user database contains the same combination of the user name and password.

Note that another authentication method, such as a method using a non-contact IC card, may be employed in place of the above-described authentication method. Further, the user database necessary for authentication may not be provided in the image forming apparatus 1, but an external authentication server, such as Active Directory, may be used for user authentication.

The network control section 210 performs control concerning a network. The operation control section 201 performs control concerning the console section 106. The image reading control section 202 performs control concerning reading of originals. The image output control section 203 performs control concerning printing.

The image processing section 208 processes image data into data for use in printing, and performs image processing on image data, according to settings of e.g. aggregation printing by the user. The transmission job control section 209 performs control concerning transmission of data for use in execution of a job.

A description will be given of the operation executed for copy printing with the above-described configuration. First, the operation control section 201 generates a screen necessary for copy printing and displays the screen on the console section 106. At this time, the user can make print settings.

When the user places an original on a platen or an ADF (Automatic Document Feeder), neither of which is shown, and gives an instruction for starting reading the original, from the console section 106, the operation control section 201 shifts the control to the copy job control section 205. The copy job control section 205 instructs the image reading control section 202 to read the original, since an operation to be executed first is to read the original.

The image reading control section 202 controls the scanner 108 via the device interface 107 to thereby optically read the original set on the platen or the ADF and generate image data.

The generated image data is stored in one of the RAM 102 and the HDD 104, which is determined by the image reading control section 202, via the device interface 107 and the system bus 111, by the storage control section 204.

Next, to print the image data, the copy job control section 205 instructs the image output control section 203 to print the image data stored by the storage control section 204.

The image output control section 203 instructs the image processing section 208 to perform image processing on the image data stored by the storage control section 204, according to the print settings made by the user.

When the processing of the image data for printing is completed, the image processing section 208 causes the storage control section 204 to store the processed image data.

The image output control section 203 reads out the image data and sends the same to the printer 109 via the system bus 111 and the device interface 107. The printer 109 sequentially prints the received image data on sheets.

In the following description, the copy job control section 205, the storage job control section 206, and the transmission job control section 209 will also be sometimes collectively referred to as the job control section.

FIG. 3 is a diagram of an example of a database concerning personal settings stored in the HDD 104 appearing in FIG. 1.

The database in FIG. 3 is composed of copy setting information 502, transmission setting information 505, storage setting information 508, and state-before-logout 511, which are stored in association with each user identifier.

The user identifier 501 as user information is information for uniquely identifying a logged-in user, which is a value set to be different on a user-by-user basis.

The copy setting information 502 is composed of personal settings 503 of a copy application and a storage setting 504 indicative of whether or not settings are to be stored as personal settings.

In FIG. 3, a double-sided printing mode and a finisher mode are stored as the personal settings 503 associated with user identifier A00001, and the storage setting 504 is set to ON indicating that the settings are to be stored.

On the other hand, although the storage setting 504 associated with user identifier A00002 is set to ON, no settings associated therewith have been stored yet as the personal settings 503.

The transmission setting information 505 is composed of personal settings 506 for a transmission application and a storage setting 507 indicative of whether or not settings are to be stored as personal settings.

In FIG. 3, the double-sided printing mode and an address have been stored as personal settings 506 associated with user identifier A00002, and the storage setting 507 is set to ON.

The storage setting information 508 is composed of personal settings 509 for a storage application and a storage setting 510 indicative of whether or not settings are to be stored as personal settings.

In FIG. 3, in personal settings 509 associated with user identifier A00001, the double-sided printing mode and the finisher mode, which are set for print data identified by Document ID: 01, have been stored as personal settings, and the storage setting 510 is set to ON.

Note that although each set of the personal settings 503, 506, and 509 is configured to store only information on differences from initial settings, it may be configured to store all information including the initial settings.

Further, each of the storage settings 504, 507, and 510 can be changed by the user.

The storage settings 504, 507, and 510 can be set for the respective applications. Therefore, even for a user who always uses some specific applications without changing settings once made for each of them, but uses the other applications with settings changed each time, it is possible to appropriately cause settings made in the past to be reflected on the settings of each of the specific applications at the start of use of the image forming apparatus 1. This contributes to an improvement of user-friendliness of operation.

The state-before-logout 511 is information indicative of an application used by a logged-in user immediately before logging out. FIG. 3 shows that the user identified by user identifier A00001 used the copy application immediately before logging out, and the user identified by user identifier A00002 used the transmission application immediately before logging out.

As described above, the personal settings are associated with user information indicative of a user who made settings concerning the operation of applications.

The image forming apparatus 1 according to the present embodiment has installed thereon at least the above-mentioned three applications, i.e. the copy application, the transmission application, and the storage application.

In the following, a description will be given of a user interface used in the present embodiment. In the following description, descriptions of keys, buttons, modes, etc. which are not directly related to the present embodiment are omitted.

Figure 4:
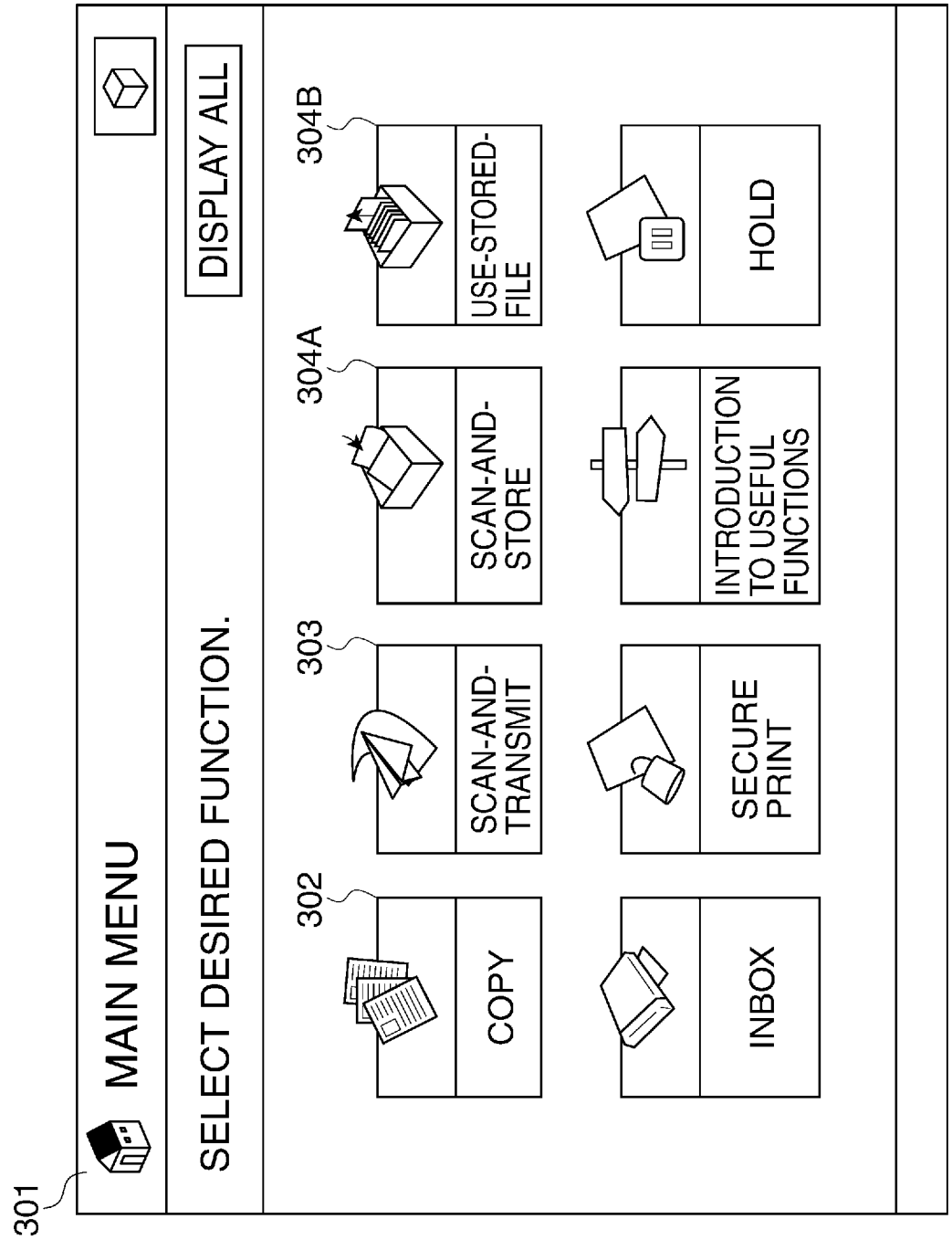
FIG. 4 is a view of a main menu screen displayed on a console section appearing in FIG. 1.
Figure 5:
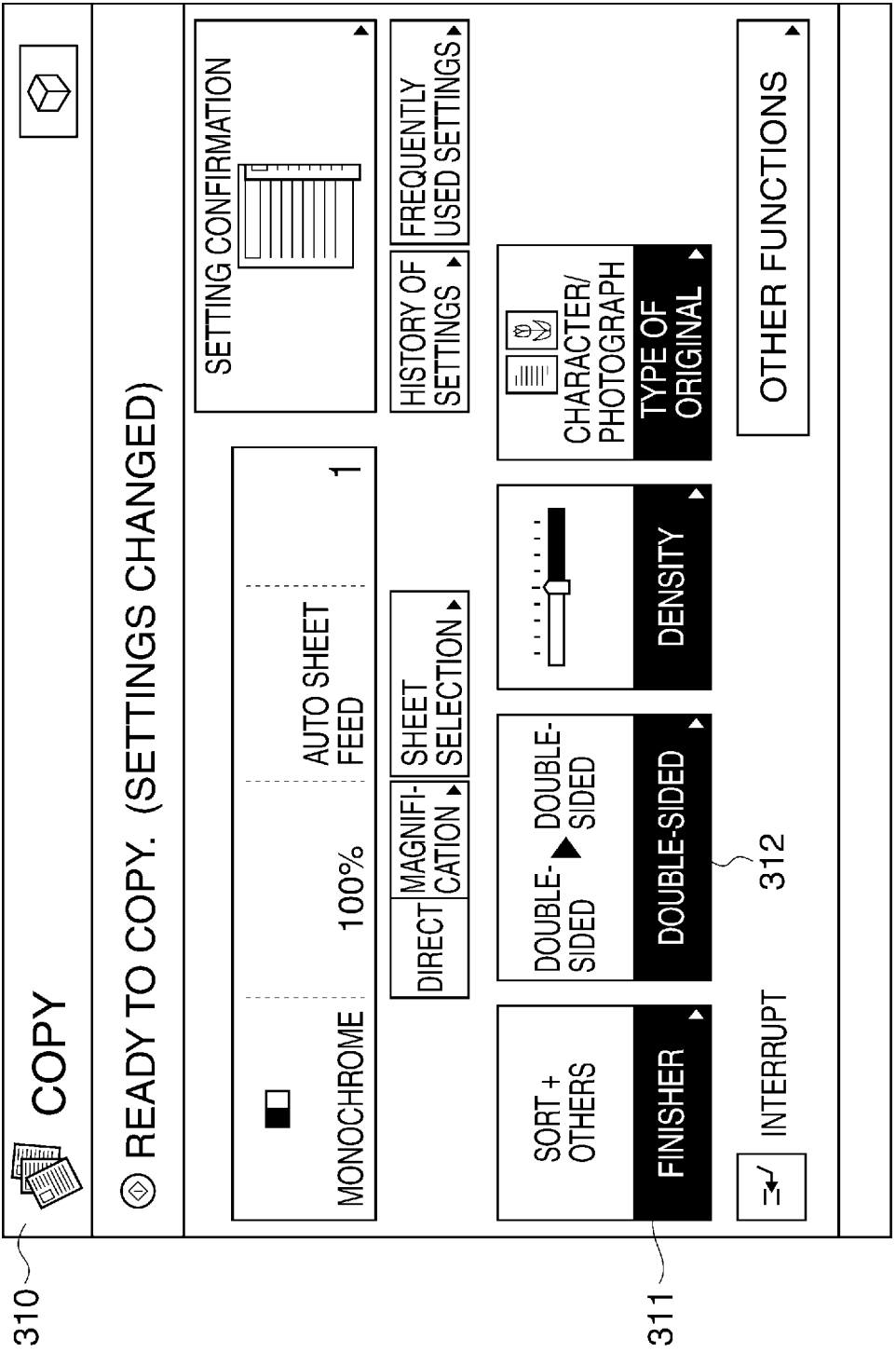
FIG. 5 is a view of a copy screen displayed on the console section appearing in FIG. 1.

FIGS. 4 and 5 are views showing a main menu screen 301 and a copy screen 310, respectively, which are displayed on the console section 106 appearing in FIG. 1.

FIG. 4 shows the main menu screen 301 which is displayed as an initial screen when the image forming apparatus 1 is powered on.

A copy application selection button 302 is used to shift to the copy screen 310. A transmission application selection button 303 is used to shift to a transmission screen 320. The term "transmission" is intended here to represent a process for transmitting image data read by the scanner 108 of the image forming apparatus 1 by e-mail or transmitting the same to a file server.

Storage application selection buttons 304A and 304B are used to shift to a storage screen 330 and a stored file usage screen 340, respectively. The term "storage" is intended here to represent both a process for causing the storage control section 204 to store image data, read by the scanner 108 of the image forming apparatus 1, in the HDD 104 (process of "scan and store" indicated by 304A), and a process for printing out the stored image data (process of "use stored file" indicated by 304B).

FIG. 5 shows the copy screen 310 displayed when the copy application selection button 302 is touched.

The user can use the copy screen 310 to designate print settings for printout, including settings of page layout on a sheet, settings of a finisher operation, such as stapling, and settings of image quality, such as density. On the copy screen 310, buttons selected for the settings are displayed in reverse video.

A double-sided printing button 312 is used to set the double-sided printing mode. In FIG. 5, it is shown that the double-sided printing mode has been set.

A finisher button 311 is used to set a mode concerning sorting or stapling. In FIG. 5, it is shown that the finisher mode has been set. When a start button, not shown, for giving a start instruction is operated in this state, the copy job control section 205 executes printing according to the print settings.

Figure 6:
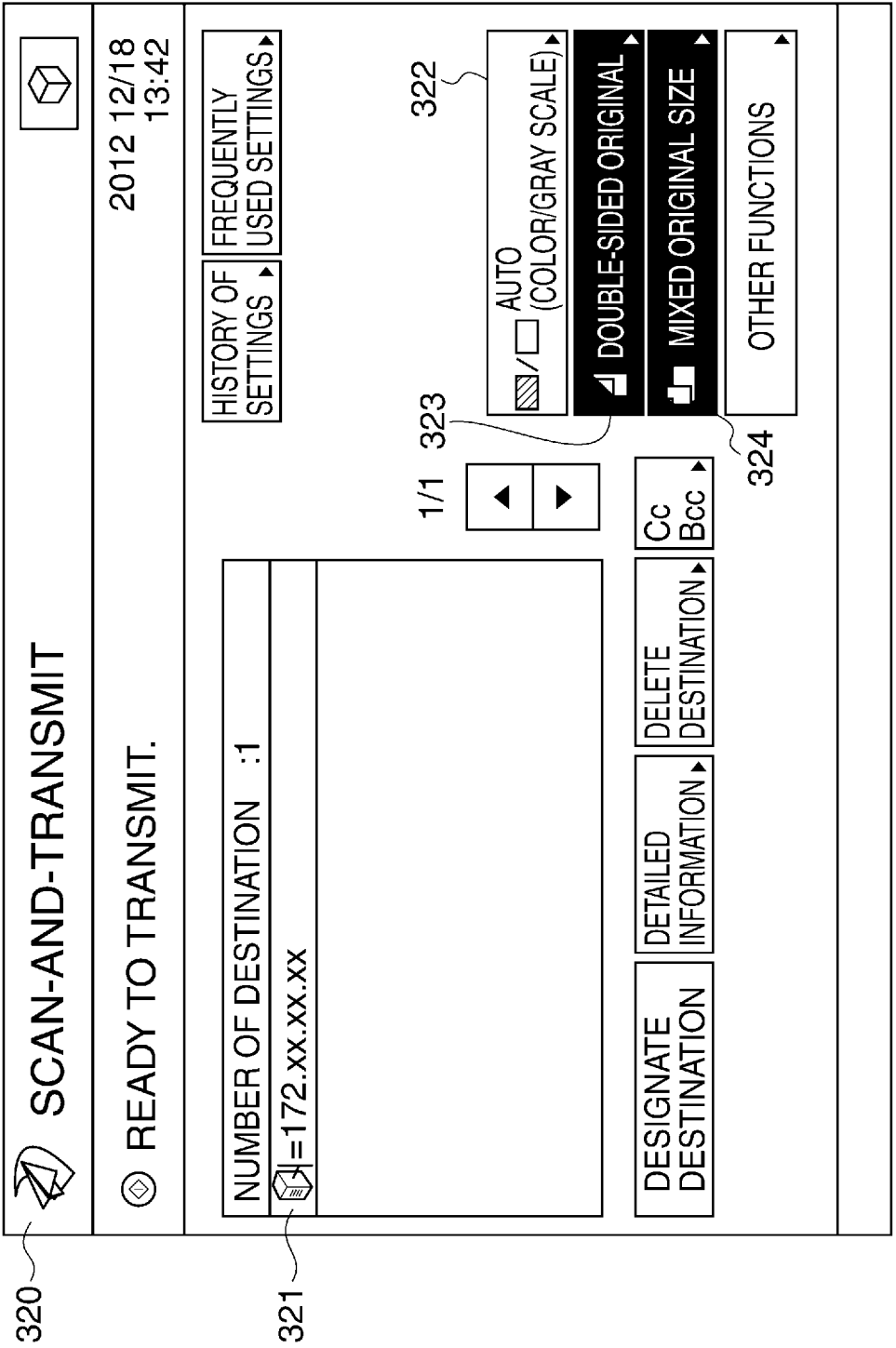
FIG. 6 is a view of a transmission screen displayed on the console section appearing in FIG. 1.
Figure 7:
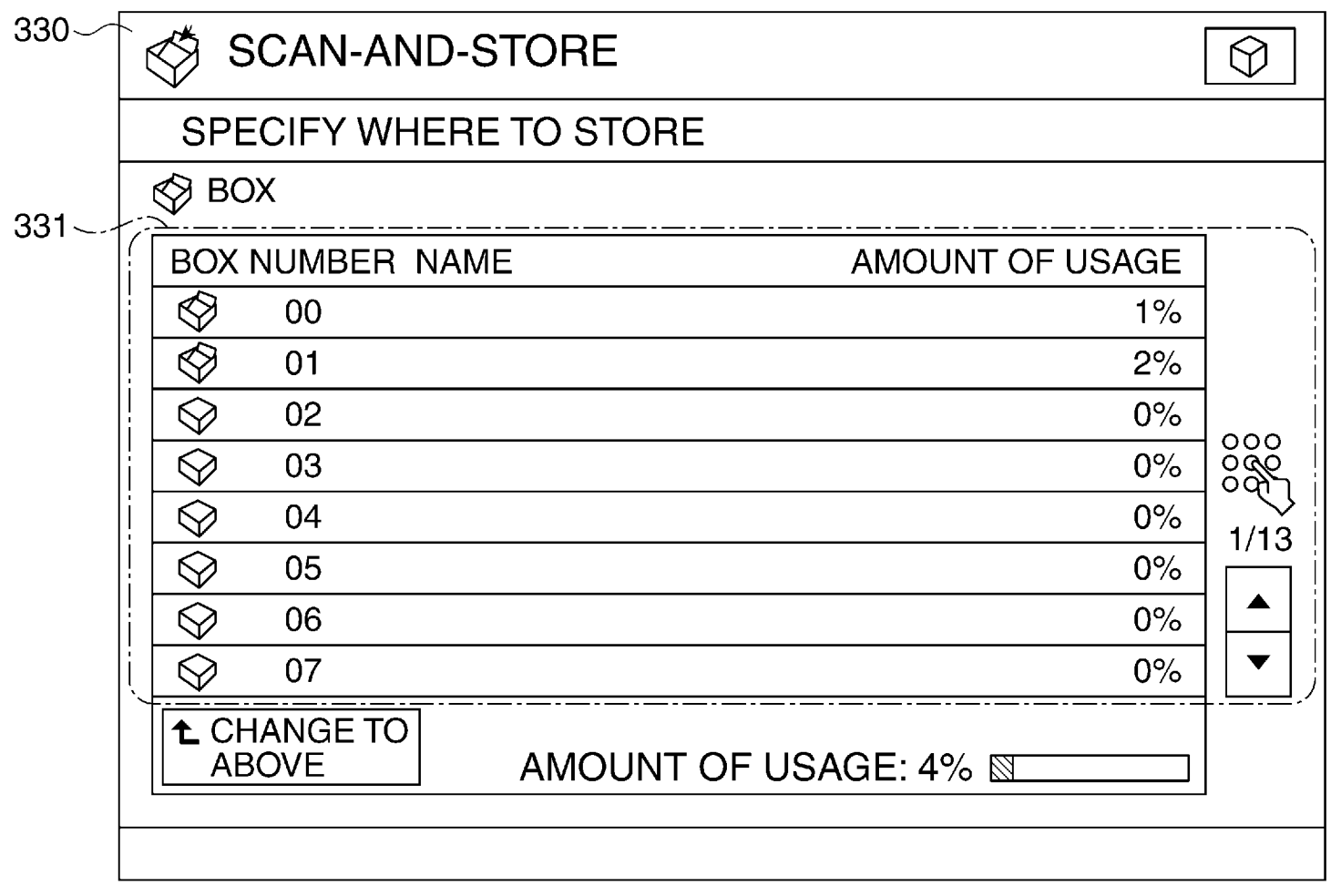

FIGS. 6 and 7 are views showing the transmission screen 320 and the storage screen 330, respectively, which are displayed on the console section 106 appearing in FIG. 1 when the transmission application selection button 303, and the storage application selection button 304A, are touched on the main menu screen 301 shown in FIG. 4.

Referring to FIG. 6, the user can set a destination and make settings for original reading, using the transmission screen 320. In the illustrated example, the transmission screen 320 displays a double-sided printing mode setting 323, a color/monochrome reading mode setting 322, and a mixed original size mode setting 324, as settings for original reading.

The double-sided printing mode setting 323 is a setting as to whether or not it is required to perform double-sided reading of an original. The color/monochrome reading mode setting 322 is a setting for automatically discriminating an original between a color original and a monochrome original before reading the original and causing the original to be read according to the discrimination. The mixed original size mode setting 324 is a setting used when originals are different in size.

Referring to FIG. 7, the user can select from boxes 331, a box in which image data is to be stored, by using the storage screen 330. When the user gives the reading instruction after selecting the box, the stored file usage screen 340 including print settings, referred to hereinafter, is displayed.

Figure 8:
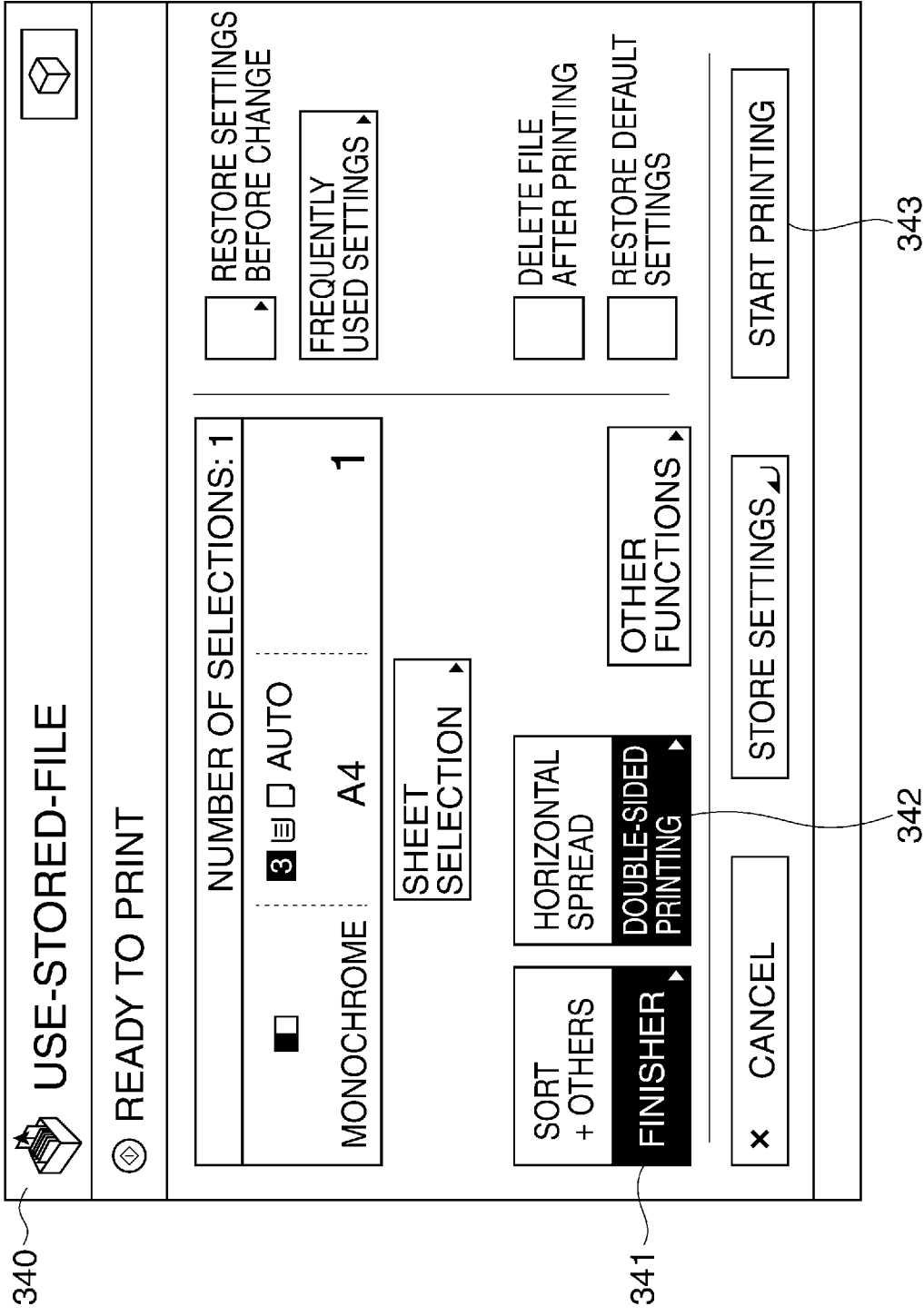
FIG. 8 is a view of a print setting screen displayed on the console section appearing in FIG. 1.
Figure 9:
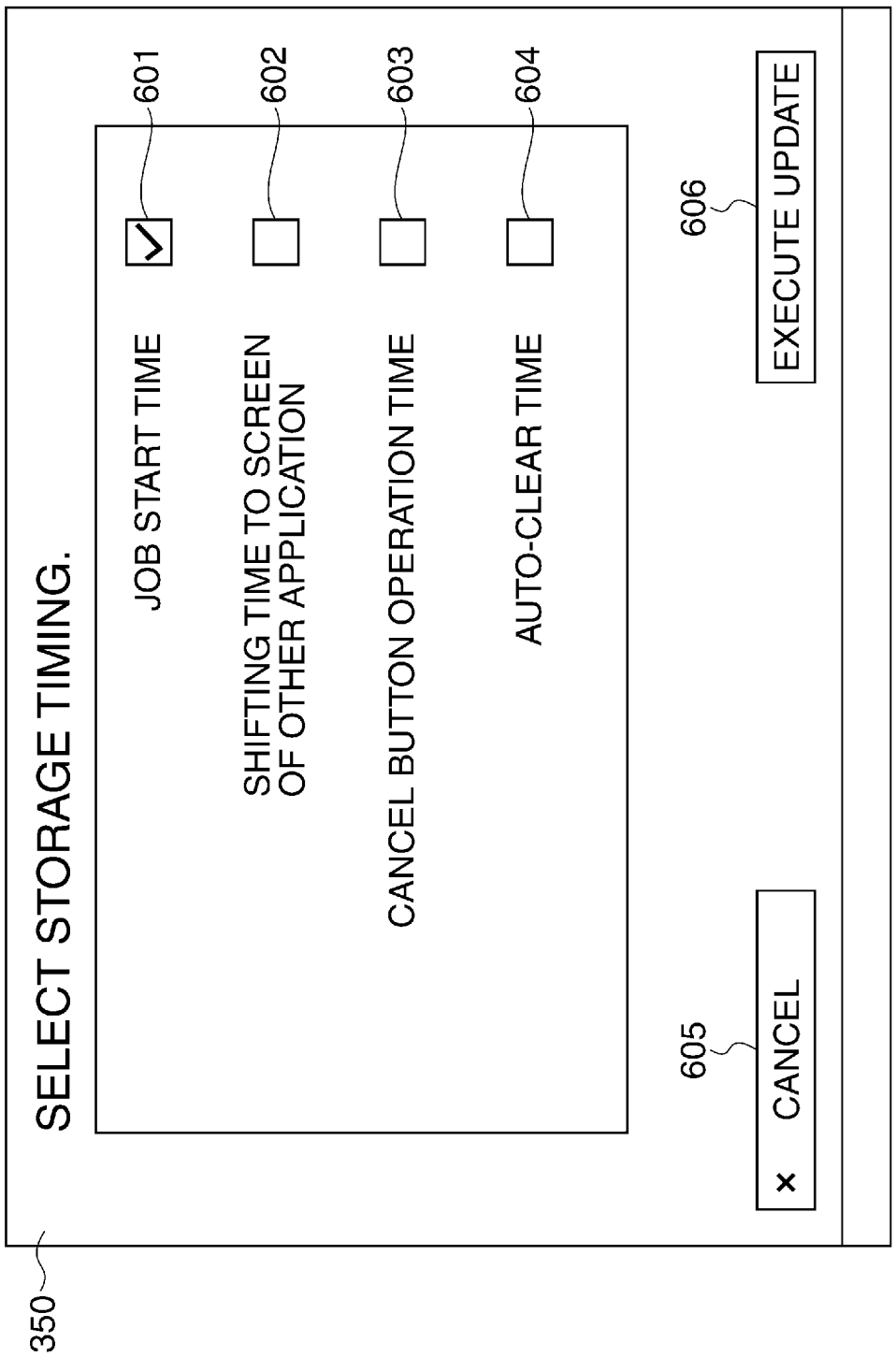
FIG. 9 is a view of a storage timing-setting screen displayed on the console section appearing in FIG. 1.

FIGS. 8 and 9 are views showing the stored file usage screen 340 and a storage timing-setting screen 350, respectively, which are displayed on the console section 106 appearing in FIG. 1.

Referring to FIG. 8, in the case of printing stored print data, the user selects print data for printing, which is stored in a box, and makes print settings on the stored file usage screen 340. Further, the user can make print settings for printout, including settings of page layout on a sheet, settings of a finisher operation, such as stapling, and settings of image quality, such as density, on the stored file usage screen 340.

On the stored file usage screen 340, buttons selected for settings are displayed in reverse video. A double-sided printing button 342 is used to set the double-sided printing mode. In FIG. 8, it is shown that the double-sided printing mode has been set.

A finisher button 341 is used to set a mode concerning sorting or stapling. In FIG. 8, it is shown that the finisher mode has been set. If a printing start button 343 is touched in this state, the storage job control section 206 reads out image data stored by the storage control section 204 and executes printing according to the print settings.

Referring to FIG. 9, in the present embodiment, the user can set timing for storing personal settings, and the storage timing-setting screen 350 is used to make this setting of timing for storing the personal settings. The user can change storage timing by selecting a check box for a setting item provided for selecting desired storage timing.

The user is not allowed to select a plurality of setting items at the same time, and the operation control section 201 performs control such that only one item is always selected.

A check box 601 is checked for selecting a job start time as the storage timing of personal settings. In the present embodiment, it is assumed that the job start time is selected for the storage timing by default.

A check box 602 is checked for selecting a screen shifting time at which the screen is switched to a screen of another application, as the storage timing of personal settings.

For example, assuming that the check box 602 has been checked, in a case where the screen is switched from the copy screen 310 to the transmission screen 320 of the transmission application without executing a job by the copy application, setting information of the copy application before the screen switching is stored as personal settings of the copy application.

A check box 603 is checked for selecting a cancel button operation time as the storage timing of personal settings.

Assuming that this check box 603 has been checked, when a cancel button is operated, settings of an application being in operation, which have been made before the cancel button is operated, are stored as personal settings.

A check box 604 is checked for selecting an auto-clear time at which an auto-clear operation is executed, as the storage timing of personal settings.

Assuming that the check box 604 has been checked, before settings of an application being in operation are cleared by execution of the auto-clear function, the settings before being cleared are stored as personal settings of the application.

A cancel button 605 is used for cancelling selection of a check box (removing a check in the check box). An update execution button 606 is used for finalizing the setting of storing personal settings at the storage timing associated with a checked check box.

The settings made on the storage timing-setting screen 350 are stored by the storage control section 204 in the HDD 104. As described above, in the present embodiment, timing for storing the personal settings in the HDD 104 can be set by the user.

Figure 10:
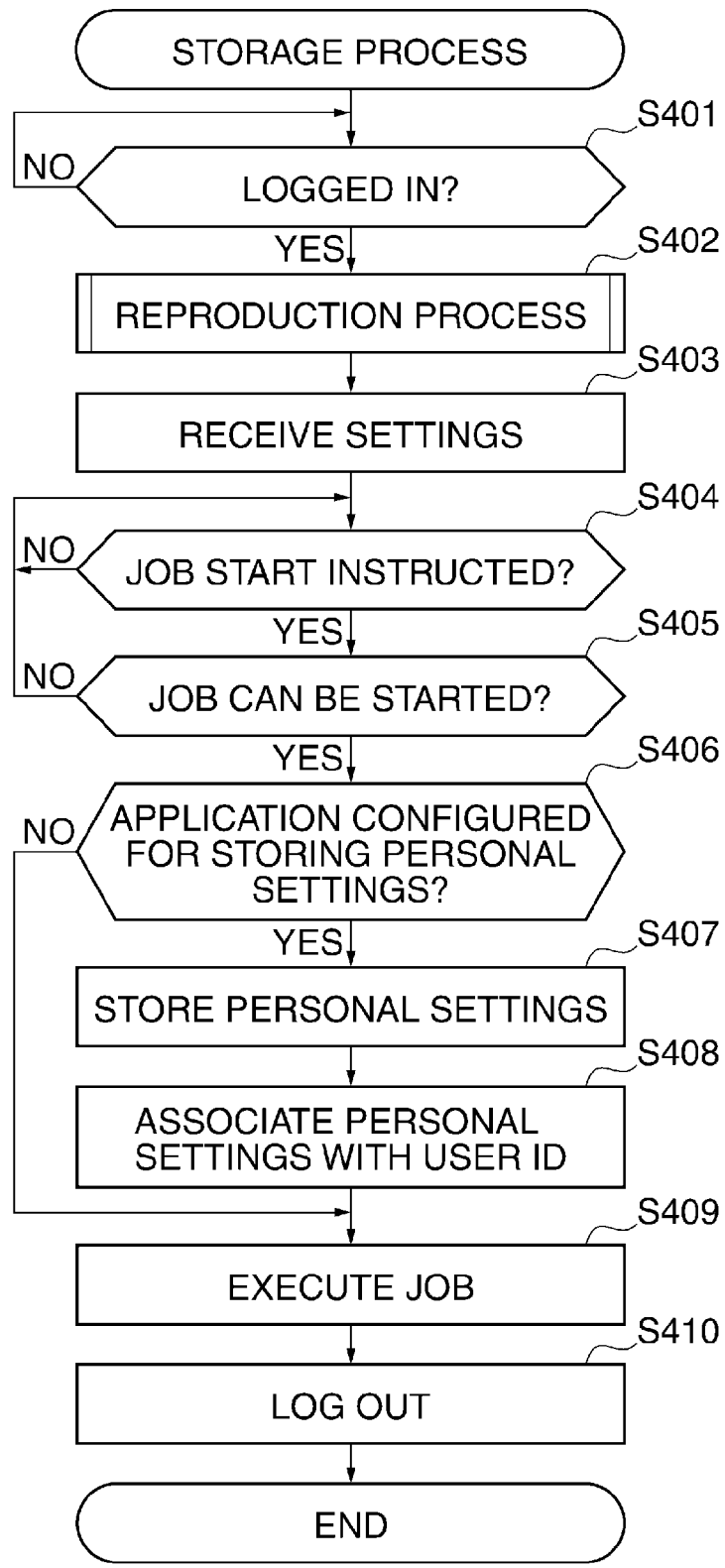
FIG. 10 is a flowchart of a storage process which is executed by a CPU appearing in FIG. 1.

FIG. 10 is a flowchart of a storage process which is executed by the CPU 101 appearing in FIG. 1.

Referring to FIG. 10, when the authentication section 207 authenticates a user using a user identifier to allow the user to log in (YES to a step S401), a reproduction process, described hereinafter, is executed for displaying a reproduced menu, the main menu, or the like (step S402). The step S401 corresponds to an operation of an authentication unit configured to authenticate a user.

Then, the operation control section 201 receives print settings and original reading settings via one of the copy screen 310, the transmission screen 320, and the storage screen 330, which are described hereinabove (step S403).

Then, when an instruction for starting a job is issued (YES to a step S404), the operation control section 201 identifies an application for which the start of the job is designated and determines whether or not the job can be started (step S405). In the step S405, on condition that setting information of the identified application is information of settings with which the job can be started, the operation control section 201 determines that the job can be started.

If it is determined in the step S405 that the job cannot be started (NO to the step S405), the CPU 101 returns to the step S404.

On the other hand, if it is determined in the step S405 that the job can be started (YES to the step S405), the operation control section 201 determines whether or not the application is configured such that personal settings of the application are stored (step S406). In the present embodiment, the user can make a setting, on an application-by-application basis, as to whether or not to store personal settings of an application in the HDD 104, and it is possible to store the personal settings according to the setting.

If it is determined in the step S406 that the application is not configured such that personal settings are to be stored (NO to the step S406), the CPU 101 proceeds to a step S409.

On the other hand, if it is determined in the step S406 that the application is configured such that personal settings are to be stored (YES to the step S406), the storage control section 204 stores personal settings of the application in the HDD 104 (step S407).

Further, the storage control section 204 associates the personal settings with the user identifier (step S408). For example, in the case of the copy application, assuming that the settings are as shown in FIG. 5, the double-sided printing mode set by the double-sided printing button 312, and the finisher mode set by the finisher button 311 are stored as the personal settings. This causes the personal settings to be added to the database described hereinabove with reference to FIG. 3. The configuration may be such that whether or not to store the personal settings anew can be set on a user-by-user basis.

Next, the job control section causes the job to be executed according to the personal settings (step S409), and the user logs out (step S410), followed by terminating the present process.

Although in the storage process described above, the timing at which values of the personal settings are stored is set to the job start time according to the example illustrated in FIG. 9, it may be a time other than the job start time, as described as to the storage timing-setting screen 350 with reference to FIG. 9, and may be allowed to be set on a user-by-user basis.

Note that in a case where the operation control section 201 is configured in advance to make it impossible to set any combination of settings with which a job cannot be executed, if only it is possible to issue an instruction for starting a job, the job can be executed without exception, and hence the step S405 can be dispensed with.

Alternatively, the job control section may determine whether or not the job can be started according to information on settings having been made.

Figure 11:
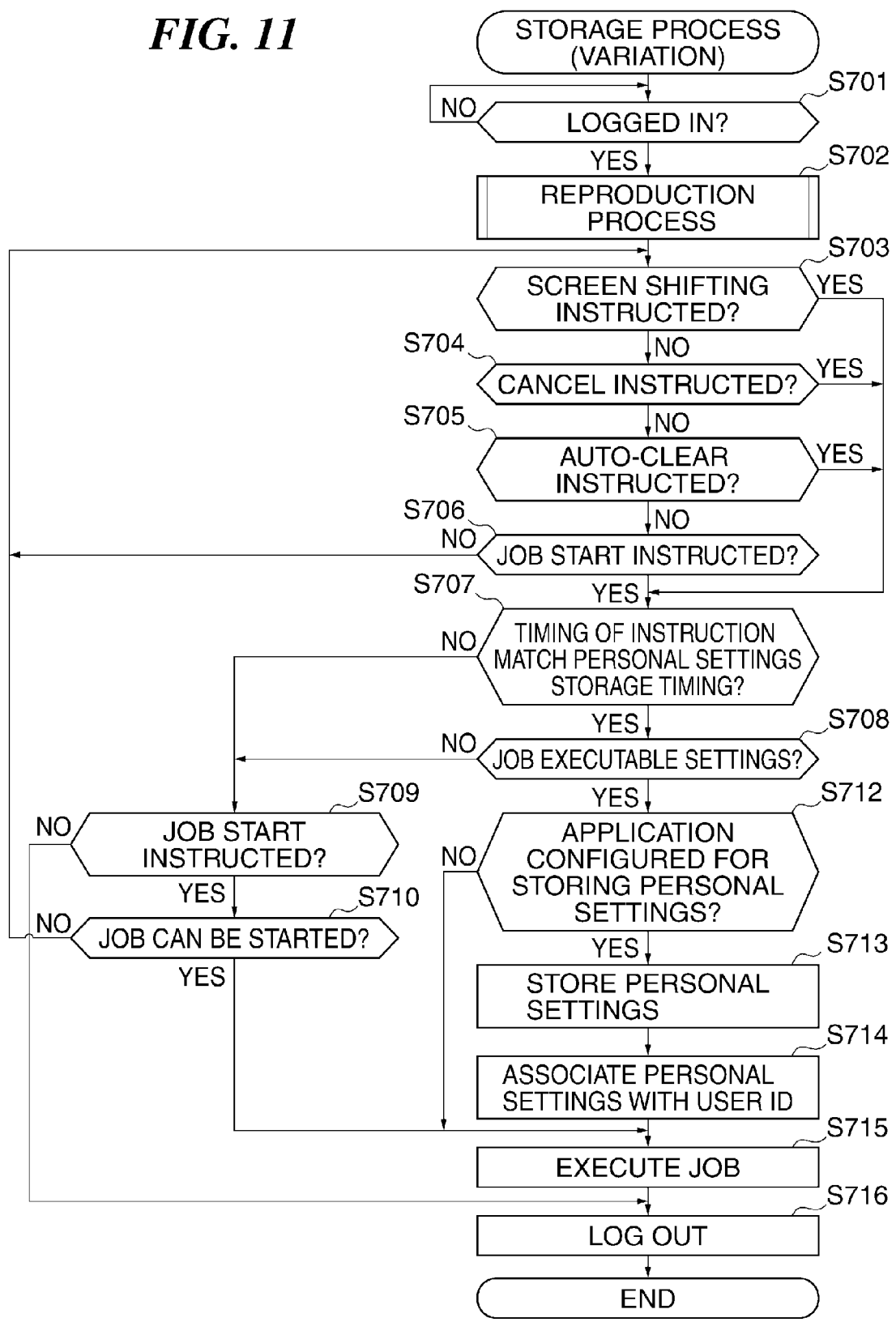
FIG. 11 is a flowchart of a variation of the storage process which is executed by the CPU appearing in FIG. 1.

FIG. 11 is a flowchart of a variation of the storage process which is executed by the CPU 101 appearing in FIG. 1.

Referring to FIG. 11, when the authentication section 207 authenticates a user using a user identifier to allow the user to log in (YES to a step S701), a reproduction process, described hereinafter, is executed for displaying a reproduced menu, the main menu, or the like (step S702).

Then, the operation control section 201 determines whether or not an instruction for shifting from the currently displayed screen to another screen is issued (step S703).

If it is determined in the step S703 that no instruction for shifting from the currently displayed screen to another screen is issued (NO to the step S703), the operation control section 201 determines whether or not an instruction for cancellation is issued (step S704).

If it is determined in the step S704 that no instruction for cancellation is issued (NO to the step S704), the operation control section 201 determines whether or not an instruction for an auto-clear operation is issued (step S705).

If it is determined in the step S705 that no instruction for an auto-clear operation is issued (NO to the step S705), the operation control section 201 determines whether or not an instruction for starting a job is issued (step S706).

On the other hand, if any of the answers to the steps S703, S704, and S705 is affirmative (YES), the CPU 101 directly proceeds to a step S707.

If it is determined in the step S706 that no instruction for starting a job is issued (NO to the step S706), the CPU 101 returns to the step S703.

On the other hand, if it is determined in the step S706 that an instruction for starting a job is issued (YES to the step S706), the CPU 101 proceeds to the step S707. In the step S707, the operation control section 201 determines whether or not timing of the instruction determined to have been issued at any of the steps S703 to S706 matches the storage timing of the personal settings.

More specifically, the operation control section 201 determines whether or not the operation instructed at any of the steps S703 to S706 matches the storage timing of the personal settings stored by the storage control section 204 in the HDD 104. As described hereinabove, from the screen shown in FIG. 9, the user can set the storage timing. For example, assuming that the storage timing has been set to the screen shifting time at which the screen is switched to a screen of another application, which is set by the check box 602, if the step S707 is reached by the affirmative answer (YES) to the question of the step S703, the answer to the question of this step S707 is affirmative (YES).

If it is determined in the step S707 that the timing of the instructed operation matches the storage timing of the personal settings (YES to the step S707), the operation control section 201 identifies an application for which one of the above-mentioned instructions has been issued when the associated one of the answers to the steps S703 to S706 is affirmative (YES), and determines whether or not setting information of the identified application is information of settings with which the job can be executed (step S708).

If it is determined in the step S707 that the timing of the instructed operation does not match the storage timing of the personal settings (NO to the step S707), the CPU 101 proceeds to a step S709.

If it is determined in the step S708 that the setting information of the identified application is not information of settings with which the job can be executed, the CPU 101 also proceeds to the step S709.

On the other hand, if it is determined in the step S708 that the setting information of the identified application is information of settings with which the job can be executed (YES to the step S708), the operation control section 201 determines whether or not the application is configured such that personal settings of the application are stored (step S712). In the present embodiment, the user can make a setting, on an application-by-application basis, as to whether or not to store the personal settings of an application in the HDD 104, and it is possible to store the personal settings according to the setting.

If it is determined in the step S712 that the application is not configured such that personal settings are to be stored (NO to the step S712), the CPU 101 proceeds to the step S709.

On the other hand, if it is determined in the step S712 that the application is configured such that personal settings are to be stored (YES to the step S712), the storage control section 204 stores the personal settings of the application in the HDD 104 (step S713).

Further, the storage control section 204 associates the personal settings with the user identifier (step S714). This causes the personal settings to be added to the database described hereinabove with reference to FIG. 3. The configuration may be such that whether or not to store the personal settings anew can be set on a user-by-user basis. Then, the CPU 101 proceeds to the step S709.

In the step S709, the operation control section 201 determines whether or not an instruction for starting a job has been issued (step S709). This determination is executed because there are cases where this step is reached without passing the step S706 in which it has been determined whether or not an instruction for starting a job is issued.

If it is determined in the step S709 that no instruction for starting a job has been issued (NO to the step S709), the CPU 101 proceeds to a step S716.

On the other hand, if it is determined in the step S709 that an instruction for starting a job has been issued (YES to the step S709), the operation control section 201 identifies an application for which the start of the job is designated and determines whether or not the job can be started (step S710).

If it is determined in the step S710 that the job cannot be started (NO to the step S710), the CPU 101 returns to the step S703, whereas if it is determined in the step S710 that the job can be started (YES to the step S710), the CPU 101 proceeds to a step S715.

In the step S715, the job control section causes the job to be executed according to the settings of the application, and then in the step S716, the user logs out, followed by terminating the present process.

Figure 12:
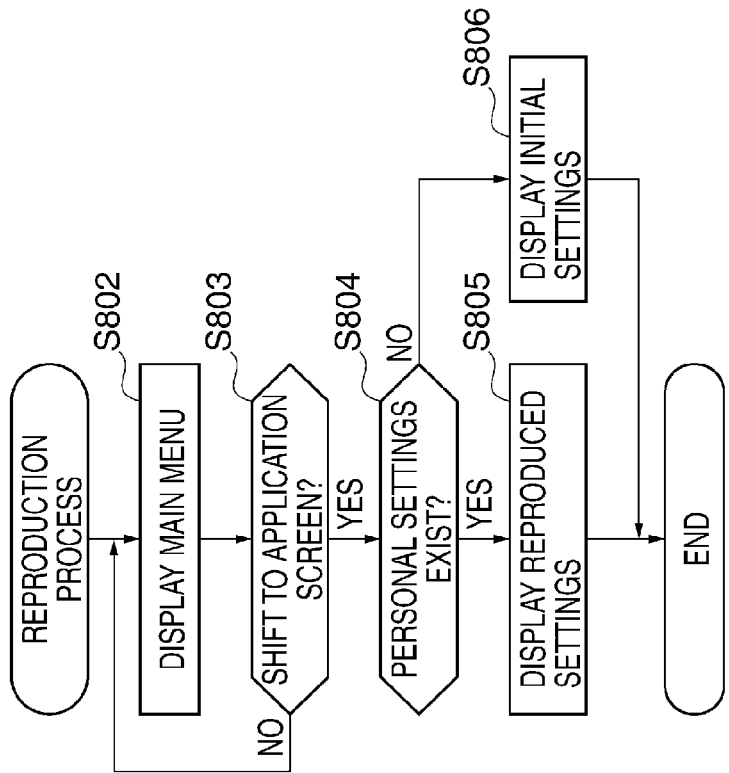
FIG. 12 is a flowchart of a reproduction process which is executed in a step of the storage process in FIG. 10.

FIG. 12 is a flowchart of the reproduction process in the step S402 of the storage process in FIG. 10.

Referring to FIG. 12, the operation control section 201 displays the main menu screen 301 described with reference to FIG. 4 (step S802).

Then, the operation control section 201 determines whether or not an instruction for shifting to an application screen is issued (step S803).

If it is determined in the step S803 that no instruction for shifting to an application screen is issued (NO to the step S803), the CPU 101 returns to the step S802.

On the other hand, if it is determined in the step S803 that an instruction for shifting to an application screen is issued (YES to the step S803), the operation control section 201 determines whether or not there is a set of personal settings including a user identifier which matches the user identifier of the user who has logged in, which are stored in the HDD 104 in association with an application for which the application screen is provided, by the storage control section 204 (step S804).

If it is determined in the step S804 that there is the set of personal settings (YES to the step S804), the operation control section 201 acquires the set of personal settings from HDD 104 using the storage control section 204, and displays the reproduced settings as settings of the application on which the acquired personal settings are reflected, on the application screen (step S805), followed by terminating the present process. This makes it possible to automatically reproduce a screen, used by the user last time, of the application without giving any instruction. The step S805 corresponds to an operation of a display control unit configured to control, in response to selection of an application by the user authenticated by the authentication unit, such that personal settings associated with the application are read from a storage unit, and the personal settings are displayed on a display section.

If it is determined in the step S804 that there is no such set of personal settings (NO to the step S804), the operation control section 201 displays the application screen with default settings (step S806), followed by terminating the present process.

An example of the reproduced settings which are displayed on the application screen as described above, in a case where the personal settings described hereinabove with reference to FIG. 3 are stored, is as follows:

Assuming that the user corresponding to the user identifier A00001 has logged in, and the instruction for shifting to the copy screen is issued in the step S803, the copy screen shown in FIG. 5 is reproduced in which the double-sided printing mode and the finisher mode are selected.

Figure 13:
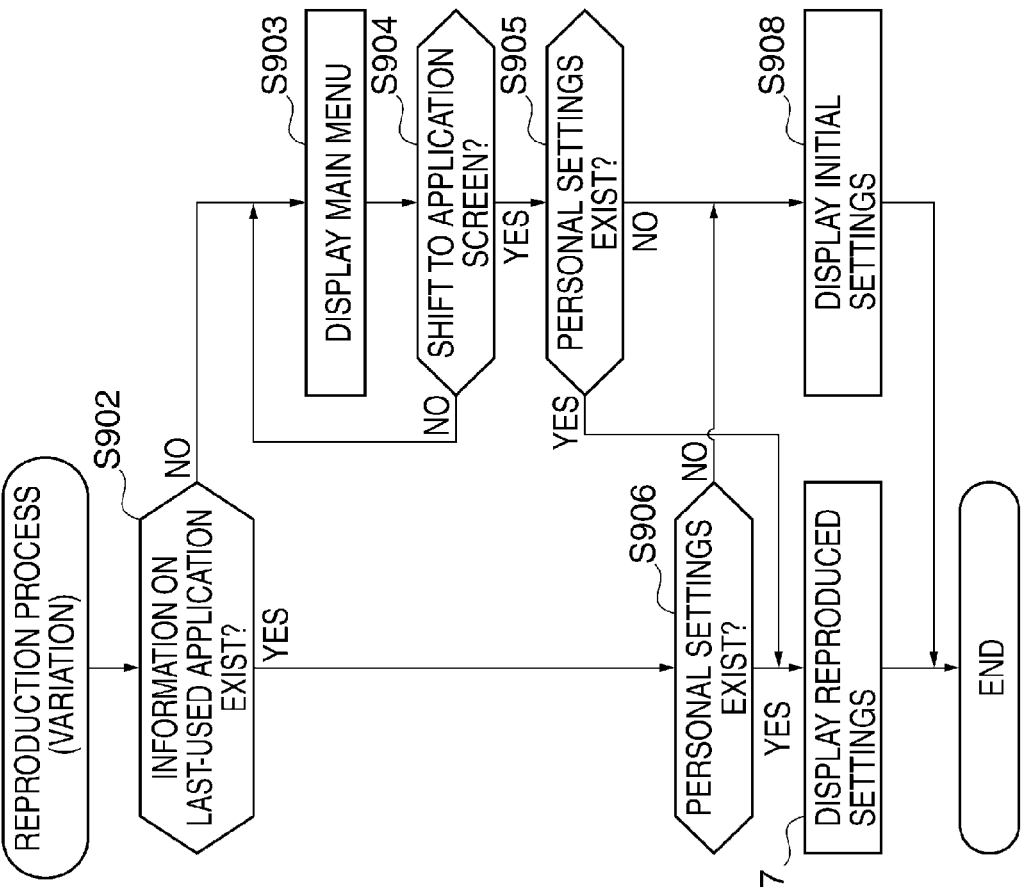
FIG. 13 is a flowchart of a variation of the reproduction process which is executed in a step of the variation of the storage process in FIG. 11.

FIG. 13 is a flowchart of a variation of the reproduction process in the step S702 of the variation of the storage process in FIG. 11.

As distinct from FIG. 12 which shows the reproduction process in which the main menu screen is displayed immediately after log-in, FIG. 13 shows the reproduction process in which a last-used application screen is displayed immediately after log-in without displaying the main menu screen.

Referring to FIG. 13, the operation control section 201 determines whether or not there is information on a last-used application used by the user who has logged in (step S902). The information on a last-used application can be acquired by searching the database described hereinabove with reference to FIG. 3 for personal settings of the user, and referring to the state-before-logout 511 when the personal settings are found.

If it is determined in the step S902 that there is information on a last-used application used by the user (YES to the step S902), the operation control section 201 determines whether or not there is a set of personal settings associated with the last-used application, including a user identifier which matches the user identifier of the user who has logged in, which are stored in the HDD 104 by the storage control section 204 (step S906). For example, in FIG. 3, the state-before-logout 511 associated with the user identifier A00002 is the transmission application, and hence the operation control section 201 determines whether or there is a set of personal settings 506 associated with the transmission setting information 505. In the case of the example illustrated in FIG. 3, the operation control section 201 determines that there is a set of personal settings associated with the last-used application.

If it is determined in the step S906 that there is no set of personal settings associated with the last-used application (NO to the step S906), the CPU 101 proceeds to a step S908.

On the other hand, if it is determined in the step S906 that there is the set of personal settings associated with the last-used application (YES to the step S906), the operation control section 201 acquires the set of personal settings from the HDD 104 using the storage control section 204, and displays reproduced settings as settings of the application on which the acquired personal settings are reflected, on the application screen (step S907), followed by terminating the present process. Thus, when the user has logged in, information indicating an application used by the user immediately before logging out on the preceding occasion is acquired from the HDD 104, and a setting screen of the application on which the acquired settings are reflected is caused to be displayed on the console section 106.

Referring again to the step S902, if it is determined in the step S902 that there is no information on a last-used application used by the user (NO to the step S902), the operation control section 201 displays the main menu screen 301 shown in FIG. 4 (step S903).

Next, the operation control section 201 determines whether or not an instruction for shifting to an application screen is issued (step S904).

If it is determined in the step S904 that no instruction for shifting to an application screen is issued (NO to the step S904), the CPU 101 returns to the step S903.

On the other hand, if it is determined in the step S904 that an instruction for shifting to an application screen is issued (YES to the step S904), the operation control section 201 determines whether or not there is a set of personal settings stored by the storage control section 204 in the HDD 104, which includes a user identifier which matches the user identifier of the user who has logged in (step S905).

If it is determined in the step S905 that there is the set of personal settings (YES to the step S905), the CPU 101 proceeds to the step S907.

On the other hand, if it is determined in the step S905 that there is no such a set of personal settings (NO to the step S905), the operation control section 201 displays the application screen with default settings (step S908), followed by terminating the present process.

In the above reproduction process, assuming that the user corresponding to the user identifier A00002 has logged in, and the transmission is determined to be the last-used application, the transmission screen shown in FIG. 6 is reproduced in which the double-sided printing mode and the address information are set.

According to the reproduction process shown in FIGS. 12 and 13, the image forming apparatus 1 according to the present embodiment is capable of properly reproducing settings desired by each user, which contributes to improvement of user-friendliness.

In the embodiment described above, the personal settings are stored on an application-by-application basis, and when the application is switched to another, or when the first selected function is not provided with settings with which the function normally terminates, or further when an erroneous operation is performed, a setting screen on which the personal settings are reflected is displayed.

As described heretofore, according to the present embodiment, it is possible to store personal settings on an application-by-application basis, and hence when the user causes a setting screen of a desired application to be displayed, the setting screen displays settings on which the personal settings are reflected. This saves the user from performing setting operations again, and hence it is possible to improve user-friendliness of operation for making settings concerning the operation of applications.

Although the copy application, the transmission application, and the storage application are described as examples of application software (see the buttons 302 to 304B appearing in FIG. 4, and FIG. 3), the present embodiment is not limited to this. When the image forming apparatus 1 is provided with a facsimile function, it is also possible to apply the present embodiment to a facsimile application.

Although in the above description, the personal settings are stored in the HDD 104 of the image forming apparatus 1, the present embodiment is not limited to this. For example, the personal settings may be stored in an SSD (Solid State Drive), a CD (Compact Disc), a DVD (Digital Versatile Disc), a Blu-ray Disc, a flash memory, a memory card, and so forth. Further, it is possible to employ a method of storing the personal settings in one server or a plurality of servers which provide a storage service as a cloud service.

Figure 14:
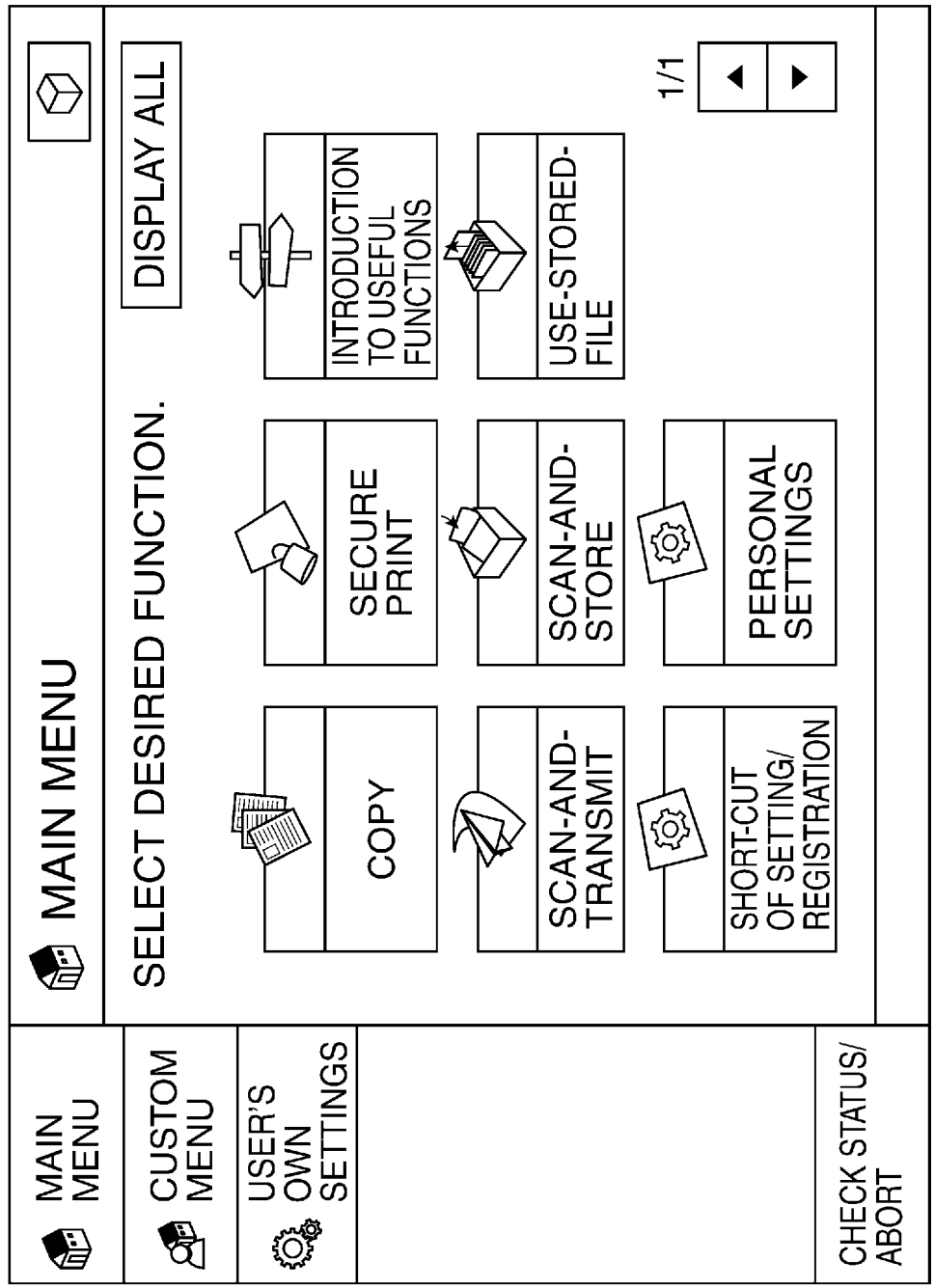
FIG. 14 is a view of a variation of the main menu screen.

Although in the above description, it is assumed that the timing of storing the personal settings is the job start time, the screen shifting time, the cancel button operation time, or the auto-clear time (see FIG. 8), the present embodiment is not limited to this. For example, after the log-in of the user in the step S701, a setting screen (not shown) for prompting the logged-in user to make personal settings may be displayed. Specifically, as the main menu screen displayed in the step S802 of the reproduction process in FIG. 12 or in the step S903 of the variation of the reproduction process in FIG. 13, the CPU 101 displays a main menu screen shown in FIG. 14, instead of the main menu screen shown in FIG. 4, on the console section 106. Further, upon detecting that the user touches "User's Own Settings" appearing at a left-side portion of the main menu screen in FIG. 14, the CPU 101 displays a screen shown in FIG. 15, and personal settings of each application input via this screen are stored in the HDD 104 as the personal settings of the logged-in user.

Although in the present embodiment, the personal settings are described using the example of information in the database shown in FIG. 3, besides the information referred to in the description, there are personal settings described hereafter.

<Display Language>

For personalization, there is provided a function for making, on a user-by-user basis, a display language setting of operation screens displayed on the touch panel of the console section 106. The display language setting is a setting of language and keyboard layout. It is assumed that types of language and keyboard layout which can be set by a logged-in user are the same as those of language and keyboard layout which can be set by the image forming apparatus 1. At the time point a user is authenticated and is allowed to log in to the image forming apparatus 1, the display language setting of the image forming apparatus 1 is switched to the display language setting made by the logged-in user, and at the time point the user logs out of the image forming apparatus 1, the display language setting of the image forming apparatus 1 is switched from the personal setting to a shared language setting set by a system administrator in advance (hereinafter referred to as "device setting").

In a case where the personal setting of display language of the logged-in user is not stored in the database of the HDD 104, the application operates not according to the personal setting but according to the device setting. Further, when the function for personalization is OFF, the application operates according to the device setting. The setting of ON/OFF of the function for personalization is set by the system administrator at the time of initial installation of the image forming apparatus 1, or as required.

<Accessibility Setting>

For personalization, there is provided a function for making accessibility settings on a user-by-user basis. The accessibility settings are settings of key repeat, screen colors reversal, and a voice input mode. As the settings of the voice input mode, there are set a voice input mode at the startup of the apparatus, a type of voice guide, a volume of voice guide, a speed of voice guide, a time-out period for voice input, and a display of confirmation of execution of an operation instructed by voice input. At the time point a user is authenticated and is allowed to log in to the image forming apparatus 1, the accessibility settings of the image forming apparatus 1 are switched to the accessibility settings made by the logged-in user, and at the time point the user logs out of the image forming apparatus 1, the accessibility settings of the image forming apparatus 1 are switched to the device settings of accessibility. The start of the voice input mode is instructed by pressing and holding a reset key (not shown) of the console section 106 or by pressing and holding a Push-to-Talk button (not shown).

Note that as a limitation, when the voice input mode is active, if the display language is switched, the voice input mode is terminated, and hence, in a case where the user desires to use the voice input mode after the display language of the personal settings is switched to another, the voice input mode is required to be started again.

When there are no personal settings of accessibility, each application operates according to the device settings. Further, when the function for personalization is OFF as well, the application operates according to the device settings.

<Initial Screen after Log-In>

For personalization, there is provided a function for setting an initial screen to be displayed first after log-in, on a user-by-user basis. A screen to be displayed as the initial can be selected from the main menu screen shown in FIG. 4, operation screens associated with respective buttons displayed on the main menu screen, a custom menu screen (not shown), and a status confirmation screen (not shown). At the time point a user is authenticated and is allowed to log in to the image forming apparatus 1, the screen of the image forming apparatus 1 is switched to the initial screen set by the user.

However, when the image forming apparatus 1 is operating in a function-specific authentication mode (authentication mode for authenticating a user at timing of selection of a function of the image forming apparatus 1 by the user), user authentication is executed at a time point that the screen is shifted from the main menu screen to a screen associated with a designated function, and hence even if the initial screen to be displayed after log-in has been set, the setting is invalidated.

Through cooperation with a server, it is possible to synchronize the image forming apparatus 1 with another image forming apparatus, to thereby share the initial screen setting, on a user-by-user basis. If the synchronized initial screen setting is the setting of a screen of a function which cannot be made use of by the image forming apparatus 1, the screen is shifted to the main menu screen in FIG. 4.

If there is no personal setting of the initial screen after log-in, the application operates according to the device setting. Further, if the function for personalization is OFF, the application operates according to settings made by the system administrator in advance.

<Default Screen>

For each application, there can be set a default screen which is displayed when the application is started. For the copy application, a screen of either "Quick" or "Normal" can be selected as its default screen. For the transmission application, one of screens of "Address Book", "Frequently Used Settings", "One Touch", and "Normal" can be selected as its default screen. For facsimile application, one of screens of "Address Book", "Frequently Used Settings", and "Normal" can be selected as its default screen. For management application of job status and history, one of screens of "Copy/Print", "Transmission/Reception", "Storage", and "Consumables/Others" can be selected as its default screen.

If there is no personal setting of the default screen, the application operates according to the device setting. Further, if the function for personalization is OFF, the application operates according to device settings made by the system administrator in advance.

<History of Settings (Call)>

The history of settings (call) is a function for memorizing settings of jobs executed by a copy function, a scan-and-transmit function, and the facsimile function, to thereby enable easy restoration of settings of a job. For personalization, there is provided a function for memorizing history of settings of three jobs at the maximum in the past for each of the above functions, on a user-by-user basis.

During cooperation with a server, history of settings is not synchronized with that of another device. This is because the history of settings (call) is automatically stored by the system, and hence if it is synchronized with that of another device, it becomes difficult for the user to understand contents of the call.

If there is no personal setting of the history of settings, the application operates with no history of settings of jobs in the past. Further, if the function for personalization is OFF, the application memorizes three jobs at the maximum for the whole image forming apparatus 1.

<Default Job Settings>

In the copy function (copy application), the scan-and-transmit function (transmission application), a use-stored-file function or scan-and-store function (storage application), and the facsimile function (facsimile application), it is possible to change default job settings on a job setting screen. For personalization, there is provided a function for memorizing default job settings of each application, on a user-by-user basis. Default job settings made by the user are reflected on the settings of each associated application at a time when the screen is shifted to the job setting screen of the application.

If there are no personal settings of the default job settings, the application operates according to factory settings. Further, if the function for personalization is OFF, the application operates according to the device settings.

Through cooperation with a server, it is possible to have the default job settings synchronized with another device, and share the same, on a user-by-user basis.

<Custom Menu>

A custom menu is a function for providing short-cut buttons storing settings. The short-cut buttons provided by the custom menu include shared buttons which can be used by all users, and my buttons which can be used on a user-by-user basis.

By making the custom menu compatible with personalization, it is possible to synchronize the shared buttons and my buttons with another device through cooperation with a server, to thereby share the buttons. Note that when no user is logged in, my buttons cannot be used.

<Address Book>

The address book is a function for registering addresses for use in transmitting an image obtained by scanning using the transmission application or the facsimile application. As the address book, a shared address book is provided which all users can use. By making the address book compatible with personalization, there are provided my address book which can be used on a user-by-user basis and a group address book which can be used on a group-by-group basis.

Through cooperation with a server, it is possible to have the shared address book, my address book, and the group address book synchronized with another device, and share them, on a user-by-user basis.

Further, if the function for personalization is OFF, the application can make use of the shared address book, but cannot make use of my address book or the group address book.

<Report Output>

A report which is manually output is output according to the display language of a logged-in user. Further, a report which is automatically output is output according to the display language of user who has been logged-in when it is output. If the function for personalization is OFF, a report is output according to the device setting of the display language.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-080388 filed Apr. 8, 2013, and Japanese Patent Application No. 2014-034161 filed Feb. 25, 2014, which are hereby incorporated by reference herein in their entirety.

What is claimed is:

1. An image forming apparatus comprising:
a memory device; and
a processor configured to execute computer executable instructions recorded on the memory device, the computer executable instructions including instructions, that when executed by the processor, cause the image forming apparatus to:
hold, so as to correspond to identification information of a user, a setting value of a job for each of a plurality of respective applications, the plurality of applications including at least a copy application of executing printing based on image data generated by reading an image, and a transmission application of transmitting the generated image data to an external device;
authenticate a user;
display a first screen for selecting one application from among the plurality of applications, according to the authentication of the user;
receive a selection of one application from among the plurality of applications via the first screen;
read the setting value held so as to correspond to the identification information of the authenticated user, the setting value being of the one application selected via the first screen;
display a second screen, on which the read setting value is reflected, for receiving a setting value of the job to be executed;
execute the job based on the setting value of the job received via the second screen; and
receive an instruction for causing the setting value of the job received via the second screen to be held so as to correspond to the identification information of the authenticated user,
wherein the instruction is received before the job is executed, and
wherein the computer executable instructions further include instructions, that when executed by the processor, cause the image forming apparatus to set, for each of the plurality of applications, whether or not to cause the setting value of the job to be held so as to correspond the identification information of the user,
wherein the setting value of the job received via the second screen is held so as to correspond to the identification information of the authenticated user, based on the reception of the instruction, in a case where the one application selected via the first screen matches with the application in which the setting value of the job is set to be caused to be held so as to correspond the identification information of the user, and
the setting value of the job received via the second screen is not held so as to correspond to the identification information of the authenticated user in a case where the one application selected via the first screen does not match with the one application in which the setting value of the job is set to be caused to be held so as to correspond the identification information of the user.

2. The image forming apparatus according to claim 1, wherein the computer executable instructions further include instructions, that when executed by the processor, cause the image forming apparatus to determine whether or not the setting value of the job is held so as to correspond to the identification information of the authenticated user based on the one application selected via the first screen,
wherein the second screen is displayed together with the read setting value of the job in a case where it is determined that the setting value of the job is held so as to correspond to the identification information of the authenticated user, and the second screen is displayed together with a default setting value of the job in a case where it is determined that the setting value of the job is not held so as to correspond to the identification information of the user.

3. The image forming apparatus according to claim 1, wherein the computer executable instructions further include instructions, that when executed by the processor, cause the image forming apparatus to set a condition for storing the setting value of the job,
wherein the setting value of the job received via the second screen is stored according to the condition being satisfied.

4. The image forming apparatus according to claim 3, wherein the condition comprises at least one of a job start time, a screen shifting time to another application, a cancel button operation time, and an auto-clear time.

5. A method of controlling an image forming apparatus on which a plurality of applications are installed, comprising:
holding, so as to correspond to identification information of a user, a setting value of a job for each of a plurality of respective applications, the plurality of applications including at least a copy application of executing printing based on image data generated by reading an image, and a transmission application of transmitting the generated image data to an external device;
authenticating a user;
displaying a first screen for selecting one application from among the plurality of applications, according to the authentication of the user;
receiving a selection of one application from among the plurality of applications via the first screen;
reading the setting value so as to correspond to the identification information of the authenticated user, the setting value being of the one application selected via the first screen;
displaying a second screen, on which the read setting value is reflected, for receiving a setting value of the job to be executed;
executing the job based on the setting value of the job received via the second screen; and
receiving an instruction for causing the setting value of the job received via the second screen to be held so as to correspond to the identification information of the authenticated user,
wherein the instruction is received before the job is executed, and
wherein the method further comprises setting, for each of the plurality of applications, whether or not to cause the setting value of the job to be held so as to correspond the identification information of the user,
wherein the setting value of the job received via the second screen is held so as to correspond to the identification information of the authenticated user, based on the received instruction, in a case where the one application selected via the first screen matches with the application in which the setting value of the job is set to be caused to be held so as to correspond the identification information of the user, and
the setting value of the job received via the second screen is not held so as to correspond to the identification information of the authenticated user in a case where the one application selected via the first screen does not match with the one application in which the setting value of the job is set to be caused to be held so as to correspond the identification information of the user.

6. A non-transitory computer-readable storage medium storing a control program for executing a method of controlling an image processing apparatus on which a plurality of applications are installed,
wherein the method comprises:
holding, so as to correspond to identification information of a user, a setting value of a job for each of a plurality of respective applications, the plurality of applications including at least a copy application of executing printing based on image data generated by reading an image, and a transmission application of transmitting the generated image data to an external device;
authenticating a user;
displaying a first screen for selecting one application from among the plurality of applications, according to the authentication of the user;
receiving a selection of one application from among the plurality of applications via the first screen;
reading the setting value so as to correspond to the identification information of the authenticated user, the setting value being of the one application selected via the first screen;
displaying a second screen, on which the read setting value is reflected, for receiving a setting value of the job to be executed;
executing the job based on the setting value of the job received via the second screen; and
receiving an instruction for causing the setting value of the job received via the second screen to be held so as to correspond to the identification information of the authenticated user,
wherein the instruction is received before the job is executed, and
wherein the method further comprises setting, for each of the plurality of applications, whether or not to cause the setting value of the job to be held so as to correspond the identification information of the user,
wherein the setting value of the job received via the second screen is held so as to correspond to the identification information of the authenticated user, based on the received instruction, in a case where the one application selected via the first screen matches with the application in which the setting value of the job is set to be caused to be held so as to correspond the identification information of the user, and
the setting value of the job received via the second screen is not held so as to correspond to the identification information of the authenticated user in a case where the one application selected via the first screen does not match with the one application in which the setting value of the job is set to be caused to be held so as to correspond the identification information of the user.

* * * * *